United States Patent
Hofmann et al.

(10) Patent No.: US 9,011,061 B2
(45) Date of Patent: Apr. 21, 2015

(54) HOLDING DOWEL

(75) Inventors: Juergen Hofmann, Eisenberg (DE); Michael Demerath, Hueffler (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 176 days.

(21) Appl. No.: 13/375,875

(22) PCT Filed: Jun. 22, 2010

(86) PCT No.: PCT/EP2010/003814
§ 371 (c)(1),
(2), (4) Date: Feb. 20, 2012

(87) PCT Pub. No.: WO2011/003514
PCT Pub. Date: Jan. 13, 2011

(65) Prior Publication Data
US 2012/0131772 A1 May 31, 2012

(30) Foreign Application Priority Data
Jun. 23, 2009 (DE) .................. 10 2009 030 040

(51) Int. Cl.
*F16B 37/04* (2006.01)
*F16B 33/00* (2006.01)

(52) U.S. Cl.
CPC ............. *F16B 37/043* (2013.01); *F16B 33/004* (2013.01); *Y10S 411/901* (2013.01)

(58) Field of Classification Search
USPC ........ 411/82, 182, 508, 913, 542, 369, 371.1, 411/901–904
See application file for complete search history.

(56) References Cited

U.S. PATENT DOCUMENTS

| 3,534,797 | A | | 10/1970 | Reinhard et al. |
| 5,294,225 | A | * | 3/1994 | Kazino et al. ................. 411/182 |
| 5,562,380 | A | * | 10/1996 | Hempfling et al. ........... 411/542 |
| 5,636,953 | A | * | 6/1997 | Jaeger et al. ................. 411/82.5 |
| 5,846,040 | A | * | 12/1998 | Ueno ................. 411/45 |
| 5,852,854 | A | * | 12/1998 | Pierrot et al. ................... 24/297 |
| 6,244,805 | B1 | | 6/2001 | Everard |
| 7,018,153 | B2 | * | 3/2006 | Behle et al. ................... 411/182 |
| 7,048,486 | B2 | * | 5/2006 | Schaty .......................... 411/508 |
| 7,427,181 | B2 | * | 9/2008 | Denton et al. ................ 411/383 |

(Continued)

FOREIGN PATENT DOCUMENTS

| DE | 2929461 | 1/1981 |
| DE | 4019193 | 12/1991 |

(Continued)

*Primary Examiner* — Flemming Saether
(74) *Attorney, Agent, or Firm* — Tarolli, Sundheim, Covell & Tummino LLP

(57) ABSTRACT

A holding dowel (10) for fastening a fastening means to a component (22), in particular to a vehicle body part, is adapted to be inserted into and arrested in an opening (20) of the component (22) and has a mount (26) for the fastening means. The holding dowel (10) has a base body (12) made from a hard material, which protrudes into the opening (20) and is adapted to fix the holding dowel (10) in place in the opening (20), and further has a sealing member (18) made from a flexible plastic material, which includes a surrounding sealing lip (38). In the installed condition of the holding dowel (10), the sealing lip (38) rests against the component (22) and seals the opening (20) of the component (22). The sealing member (18) is produced at least partly from a material which under the influence of heat establishes a substance-to-substance bond with the component (22).

18 Claims, 3 Drawing Sheets

(56) References Cited

U.S. PATENT DOCUMENTS

| | | | |
|---|---|---|---|
| 7,870,648 B2 * | 1/2011 | Schaty | 24/297 |
| 2005/0129458 A1 | 6/2005 | Hoffmann | |
| 2007/0048106 A1 * | 3/2007 | Christ et al. | 411/82 |
| 2008/0226412 A1 | 9/2008 | Jatzke | |

FOREIGN PATENT DOCUMENTS

| | | |
|---|---|---|
| DE | 29708112 | 9/1997 |
| DE | 10231274 | 1/2004 |
| DE | 202007003635 | 7/2007 |
| EP | 0645547 | 3/1995 |

* cited by examiner

HOLDING DOWEL

RELATED APPLICATIONS

This application corresponds to PCT/EP2010/003814, filed Jun. 22, 2010, which claims the benefit of German Application No. 10 2009 030 040.6, filed Jun. 23, 2009, the subject matter, of which is incorporated herein by reference in their entirety.

BACKGROUND OF THE INVENTION

The present invention relates to a holding dowel for fastening a fastening means to a component, in particular to a vehicle body part, the holding dowel being adapted to be inserted into and arrested in an opening of the component and having a mount for the fastening means.

Various types of holding dowels are employed in vehicle manufacturing in order to fasten a fastening means, for example a screw or bolt by which a vehicle component is held on a vehicle body part, to the latter. The holding dowel is inserted into an opening of the vehicle body part and fixed in place, and then the fastening means is inserted into a mount provided on the holding dowel. To prevent an entry of, for example, dirt or moisture through the opening, holding dowels include seals which, in the installed condition of the holding dowel, rest against the edge of the opening to seal the opening in this way.

SUMMARY OF THE INVENTION

The invention provides a holding dowel which, in comparison with the prior art, allows an improved sealing of the opening in the vehicle body part.

To this end, according to the invention provision is made for a holding dowel for fastening a fastening means to a component, in particular to a vehicle body part, the holding dowel being adapted to be inserted into and arrested in an opening of the component and having a mount for the fastening means. The holding dowel has a base body made from a hard material, which protrudes into the opening and is adapted to fix the holding dowel in place in the opening, and a sealing member made from a flexible plastic material, which includes a surrounding sealing lip which, in the installed condition of the holding dowel, rests against the component and seals the opening of the component. The sealing member is produced at least partly from a material which under the influence of heat establishes a substance-to-substance bond with the component. The holding dowel is pushed into the opening until the surrounding sealing lip rests against the edge of the opening and seals it. Subsequently, the sealing member resting against the component is heated to above its melting point, so that while cooling down, the sealing lip establishes a substance-to-substance bond with the component. The sealing member of the holding dowel is adhesively joined to the edge of the opening over an area and completely seals the opening. Owing to this adhesive joint and the use of a flexible material for the sealing member, the opening is reliably sealed even in case of mechanical stress such as, e.g., when the fastening means is fastened or vibrations occur. In addition, owing to the adhesive joint, the holding dowel is additionally fixed in place in the opening, so that it is ensured that the fastening means is securely held.

The sealing member may also be produced from a plastic material which irreversibly expands under the influence of heat. During expansion, the sealing member is able to level out unevennesses or defects in the component, so that the holding dowel according to the invention provides an improved sealing effect. In addition, the holding dowel may, for example, also be made use of for components of different material thicknesses.

The base body of the holding dowel preferably includes a first section protruding into the opening, and a flange resting against the outside of the component. The recess for mounting the fastening means is arranged on the side of the flange facing away from the component and extends through the flange into the first section. In this way, the fastening means, for example a screw or bolt, is fully held inside the holding dowel. There is no opening in the holding dowel through which the screw or bolt can project into the interior of the component or can cause a further non-tight point of the holding dowel.

One or more depressions extending in the direction of insertion may, for example, be provided on the inside of the mount, which provide a greater elasticity to the holding dowel, thus allowing it to be used more flexibly.

Preferably, the base body of the holding dowel has holding members provided thereon which engage the edge of the opening and fix the component in place in the opening.

The holding members preferably include locking members which engage on the rear side of the opening. The holding dowel is pushed by the first section into the opening of the component until the locking members engage on the rear side of the component and fix the holding dowel in place in the opening in this way. These locking members offer the advantage that the holding dowel can be installed on the component without a tool.

The base body may furthermore be provided with spring members which center the holding dowel in the opening. The spring members are able to even out different diameters of the opening, so that the holding dowel may be used for openings of different sizes. The spring members are, for example, arranged symmetrically and, in the installed condition of the holding dowel, are prestressed against the edge of the opening, so that the holding dowel is centered in the middle of the opening.

The sealing member preferably encircles the flange radially, so that the sealing member rests against the opening of the component by as large a periphery as possible.

To produce a secure connection of the base body with the sealing member, the base body preferably includes recesses into which the sealing member protrudes.

This recess may, for example, be a radially surrounding groove which is formed on the base body.

To center the holding dowel in the opening or to be able to align it therein, the base body includes mounts for a tool, for example.

Furthermore, provision is made for a method of installing a holding dowel according to the invention, comprising the following steps:
  inserting the holding dowel into an opening of a component and fixing it in place;
  heating the sealing member to above the melting point of the sealing member; and
  cooling the sealing member, so that the sealing member establishes a substance-to-substance bond with the component and seals the opening of the component.

After the holding dowel is inserted, a coating or a paint may be applied onto the component.

In the automotive industry, coatings or paints are usually baked onto the component by heating the paint. The coating or the paint is preferably heated following the application onto the component, accompanied by the sealing member also being heated to above the melting point. Therefore, no additional step is required for heating the sealing member and allowing it to cool. This may be effected during the baking of the paint, so that the production time of the component can be considerably reduced.

BRIEF DESCRIPTION OF THE DRAWINGS

Further advantages and features will be apparent from the description below in conjunction with the accompanying drawings, in which.

DESCRIPTION OF AN EXEMPLARY EMBODIMENT

Figure 1:
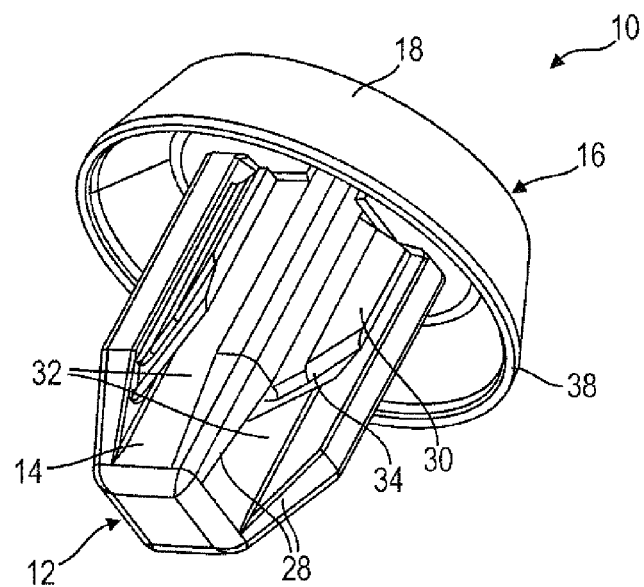
FIG. 1 shows a perspective view of a holding dowel according to the invention.
Figure 2:
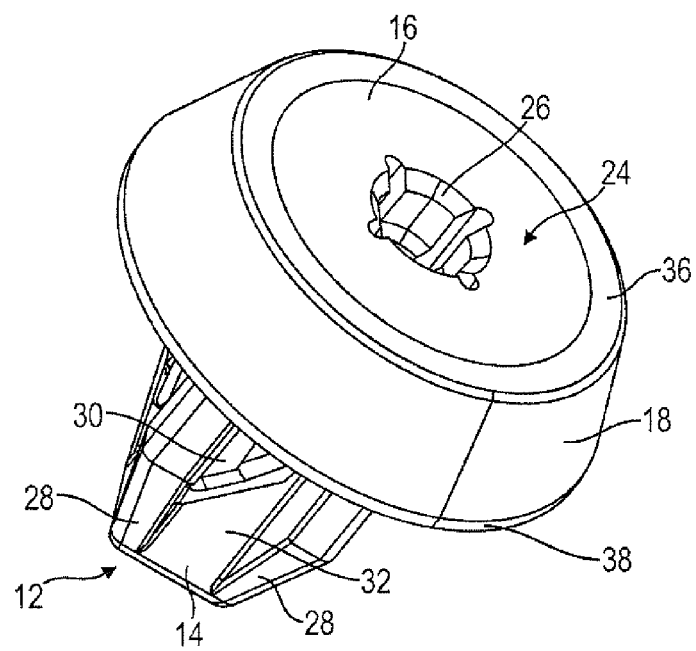
FIG. 2 shows a second perspective, view of the holding dowel of FIG. 1.
Figure 3:
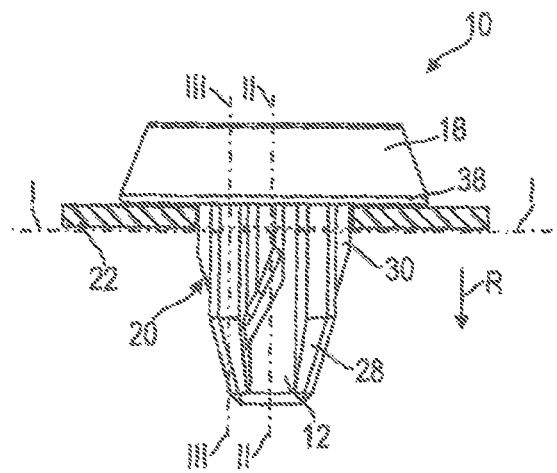
FIG. 3 shows a view of the holding dowel according to the invention, in a partially installed condition.
Figure 7:
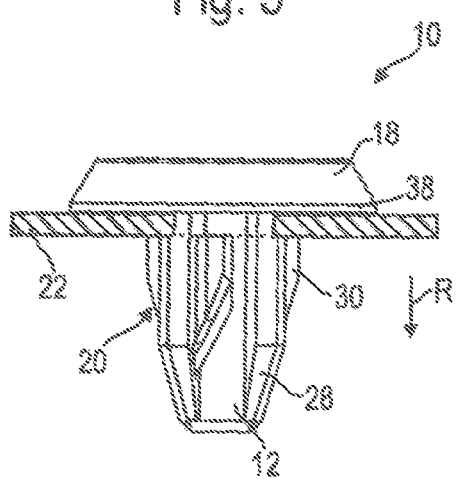
FIG. 7 shows a view of the holding dowel according to the invention, in an installed condition.

The holding dowel 10 shown in FIGS. 1 and 2 has a base body 12 made from a hard plastic material, having a first section 14 and a flange 16 to which a sealing member 18 made from a flexible plastic material is fastened. The holding dowel may be inserted by the first section 14 into an opening 20 of a component 22 in an insertion direction R and may be fixed in place in the opening 20 (see also FIGS. 3 and 7). Provided on the face 24 of the holding dowel 10 facing away from the component 22 is a mount 26 in which a fastening means may be fastened.

Figure 4:
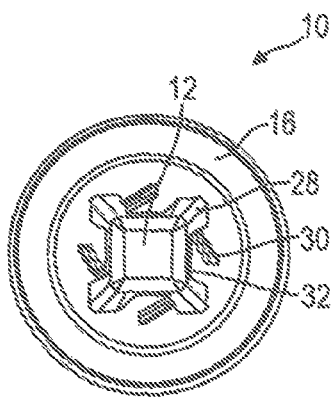
FIG. 4 shows a sectional view of the holding dowel of FIG. 3, along the section I-I.

As can be seen in particular in FIG. 4, the first section 14 here has a square cross-section which conically tapers in the insertion direction R. Owing to the square cross-section, the holding dowel 10 is reliably fixed in place in a preferably rectangular opening 20, so that it is prevented from rotating, for example when the fastening means is inserted. The holding dowel 10 or the base body 12 may, however, also have a different cross-section.

The mount 26 for the fastening member here is provided on the face 24 of the holding dowel 10 and extends through the flange 16 and into the first section 14 of the base body 12. On the inside of the mount 26 provision may be made for a thread, for example, into which a screw or bolt may be screwed. But the fastening means may also be fastened in the mount 26 in other ways. It is also conceivable, for example, to provide one or more locking members on the inside of the mount 26.

A plurality of depressions 27 extending in the insertion direction R is provided here on the inside of the mount 26. These give a greater elasticity to the holding dowel, so that the holding dowel may be employed more flexibly. In addition, the depressions here are configured such that they constitute a mount for a tool, in this case for a screwdriver. In this way, the holding dowel can be aligned in the opening 20 or retained while the fastening member is installed.

A holding member 28 is arranged in each of the corners, each holding member 28 having a locking member 30 attached thereto. The locking members 30 are spring-mounted at the holding members 28 and may be swiveled into recesses 32 on the base body 12. In the insertion direction R the locking members 30 each have a ramp-like portion 34 which, during insertion of the holding dowel 10 into the opening 20 (see FIG. 3), comes into contact with the edge of the opening and is displaced by the edge of the opening 20, so that the locking members 30 are forced into the recesses 32. Upon further insertion of the holding dowel 10, the locking members 30 can resiliently move away from the base body 12, so that they engage on the rear side of the component 22 and fix the holding dowel 10 in place on the component 22 (see FIG. 7).

Figure 5:
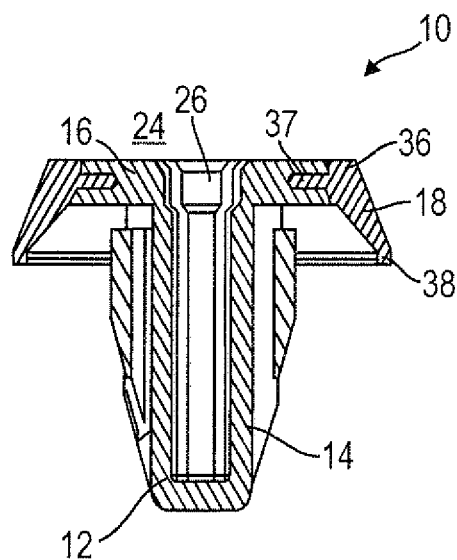
FIG. 5 shows a second sectional view of the holding dowel of FIG. 3, along the section II-II.

The sealing member 18 here has an annular portion 36 by which it is fastened to the flange 16 of the holding dowel 10. To this end, the flange 16 has a recess 37 in the form of a radially surrounding groove, into which the sealing member 18 protrudes (FIG. 5). The sealing member 18 further has a sealing lip 38 which, in the installed condition of the holding dowel 10, surrounds the opening 20, resting against the component 22 and sealing the opening 20 in this way.

Figure 6:
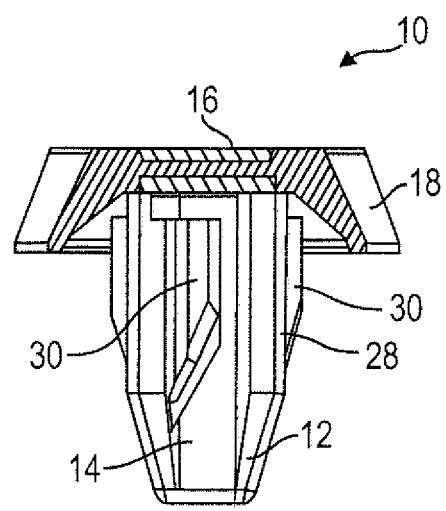
FIG. 6 shows a third sectional view of the holding dowel of FIG. 3, along the section III-III.

The sealing member 18 is produced from a heat-expandable thermoplastic plastic material here. After it is inserted into the opening 20, the holding dowel 10 is heated to above the melting point of the sealing member 18. Subsequently, the holding dowel is allowed to cool down. In the process, the plastic material establishes a substance-to-substance bond with the component and in this way produces a reliable sealing effect of the opening. Since the sealing member 18 is produced from a flexible material, this seal also withstands mechanical stresses as caused by installing the fastening means or by vibrations, for example. FIG. 6 shows the holding dowel in a further sectional view.

In order to further improve the sealing effect, it is also conceivable that the sealing member 18 is produced from a material which expands under the influence of heat. In addition to the substance-to-substance bond, this allows any unevennesses in the component 22 to be leveled out. It is also not required for the entire sealing member to be produced from the thermoplastic material. It is also conceivable that only that portion of the sealing member 18 which rests against the component 22 is produced from a thermoplastic or expandable material.

The sealing member 18 is preferably injection-molded integrally with the base body 12, but it is also conceivable to fasten the sealing member 18 to the base body 12 in other ways. More specifically, the base body need not have a groove.

Before or after insertion of the holding dowel 10, the component 22 may also be painted. When the component 22 is painted after insertion of the holding dowel 10, it is possible, for example, that the sealing member 18 is heated during the process of baking the paint or the coating, so that no additional step is required for heating the sealing member 18.

In addition, the holding dowel 10 may also include spring members which, in the installed condition of the holding dowel 10, rest against the edge of the opening 20 and are able to fix the holding dowel 10 in place in the opening or center it therein.

The invention claimed is:

1. A holding dowel (10) for fastening a fastening means to a vehicle body part component (22), the holding dowel (10) being adapted to be inserted into and arrested in an opening (20) of the component (22) and having a mount (26) for the fastening means, one or more depressions (27) extending in an insertion direction (R) being provided on the inside of the mount (26) comprising a base body (12) made from a hard material, which protrudes into the opening (20) and is adapted to fix the holding dowel (10) in place in the opening (20), spring members provided on the base body (12) center the holding dowel (10) in the opening (20), the base body (12) including holding members (28) that engage an edge of the opening (20) and fix the holding dowel (10) in place in the opening (20), locking members (30) extending from the holding members (28) and engaging a rear side of the opening (20), and a sealing member (18) made from a flexible plastic material, which includes a surrounding sealing lip (38) which, in an installed condition of the holding dowel (10), rests against the component (22) and seals the opening (20) of the component (22), wherein the sealing member (18) is produced at least partly from a material which under the influence of heat establishes a substance-to-substance bond with the component (22).

2. The holding dowel according to claim 1, wherein the sealing member (18) is produced from a plastic material which irreversibly expands from a first volume to a second volume larger than the first volume under the influence of heat.

3. The holding dowel according to claim 1 wherein the base body (12) includes a first section (14) protruding into the opening (20), and a flange (16) resting against the outside of the component (22), the mount (26) for the fastening means being arranged on the side of the flange (16) facing away from the component (22) and extending through the flange (16) into the first section (14).

4. The holding dowel according to claim 3, wherein the sealing member (18) radially encircles the flange (16).

5. The holding dowel according to claim 1, wherein the base body (12) includes et least one recess (37) into which the sealing member (18) protrudes.

6. The holding dowel according to claim 5, wherein the (37) is a radially surrounding groove.

7. The holding dowel according to claim 1, wherein the base body (12) includes mounts for a tool.

8. A method of installing a holding dowel according to claimed 1, comprising the following steps:
 inserting the holding dowel (10) into an opening (20) of a component (22) and fixing it in place;
 heating the sealing member (18) to above the melting point of the sealing member;
 cooling the sealing member (18), so that the sealing member (18) establishes a substance-to-substance bond with the component (22) and seals the opening (20) of the component (22).

9. The method according to claim 8, wherein after the holding dowel (10) is inserted, a coating or a paint is applied onto the component (22).

10. The method according to claim 9, wherein after application onto the component (22), the coating or the paint is heated, accompanied by the sealing member (18) being heated to above the melting point.

11. The holding dowel according to claim 1, wherein the holding members (28) are separated by recesses (32), the locking members (30) engaging the component (22) and swiveling relative to the holding members (28) into the recesses (32) during insertion of the base body (12) into the opening (20)

12. The holding dowel according to claim 1, wherein the sealing lip (38), when bonded with the component (22) in the installed condition, is spaced from the opening (20) in the component (22).

13. The holding dowel device of claim 1, wherein each locking member (30) swivels relative to the holding member (28) about an axis extending parallel to the insertion direction (R).

14. The holding device of claim 1, wherein the holding members (28) extend radially outward from the base body (12) and are separated by recesses (32), the locking members (30) extending at an angle from the holding members (28) and swiveling into the recesses (32) during insertion of the holding dowel (10) into the opening (20).

15. A holding dowel (10) for fastening a fastening means to a vehicle body part component (22) having an opening (20), the holding dowel (10) being adapted to be inserted into and arrested in the opening (20), comprising:
 a base body (12) made from a hard material and adapted to extend into the opening (20) to fix the holding dowel (10) within the opening (20), the base body (12) including:
 a mount (26) for receiving the fastening member; and
 holding members (28) separated by recesses (32) and engaging an edge of the opening (20) to fix the holding dowel (10) in place in the opening (20), the holding members (28) including locking members (30) which engage on a rear side of the opening (20), the locking members (30) engaging the component (22) and swiveling relative to the holding members (28) into the recesses (32) during insertion of the base body (12) into the opening (20); and
 a sealing member (18) made from a flexible plastic material and including a surrounding sealing lip (38) which, in an installed condition of the holding dowel (10), rests against the component (22) and seals the opening (20) of the component (22), wherein the sealing member (18) is produced at least partly from a material which under the influence of heat establishes a substance-to-substance bond with the component (22).

16. The holding dowel according to claim 15, wherein the sealing lip (38), when bonded with the component (22) in the installed Condition, is spaced from the opening (20) in the component (22).

17. The holding device of dam 15, wherein each locking member (30) swivels relative to the holding member (28) about an axis extending parallel to the insertion direction (R).

18. The holding device of claim 15, wherein the holding members (28) extend radially outward from the base body and the locking members (30) extend at an angle from the holding members (28).

* * * * *